United States Patent
Budica

(10) Patent No.: US 7,175,202 B2
(45) Date of Patent: Feb. 13, 2007

(54) RECREATIONAL VEHICLE CHASSIS

(75) Inventor: Lauro Budica, Mira Loma, CA (US)

(73) Assignee: Fleetwood Enterprises, Inc., Riverside, CA (US)

( * ) Notice: Subject to any disclaimer, the term of this patent is extended or adjusted under 35 U.S.C. 154(b) by 425 days.

(21) Appl. No.: 10/740,351

(22) Filed: Dec. 18, 2003

(65) Prior Publication Data

US 2005/0134033 A1  Jun. 23, 2005

(51) Int. Cl.
*B62D 21/00*  (2006.01)

(52) U.S. Cl. ...................................................... 280/781

(58) Field of Classification Search ................ 280/781, 280/797, 800, 785, 789; 297/204, 205, 35.1, 297/37.1

See application file for complete search history.

(56) References Cited

U.S. PATENT DOCUMENTS

| | | | |
|---|---|---|---|
| 1,750,221 A * | 3/1930 | Froesch ...................... | 280/781 |
| 2,144,889 A | 1/1939 | Moodie | |
| 2,853,309 A | 9/1958 | Hubbard | |
| 3,989,119 A | 11/1976 | Cady | |
| 4,045,075 A | 8/1977 | Pulver | |
| 4,534,589 A | 8/1985 | Booher | |
| 4,714,273 A | 12/1987 | Kejr | |
| 4,746,164 A | 5/1988 | Crean | |
| 5,501,504 A | 3/1996 | Kunz | |
| 5,690,378 A | 11/1997 | Romesburg | |
| 5,921,615 A | 7/1999 | Gimenez | |
| 6,205,736 B1 | 3/2001 | Amborn et al. | |
| 6,254,132 B1 | 7/2001 | Lindsay | |
| 6,343,830 B1 | 2/2002 | Ingram et al. | |
| 6,886,875 B1 * | 5/2005 | Crean ...................... | 296/26.13 |
| 2002/0067052 A1 | 6/2002 | Platner et al. | |
| 2005/0052052 A1 * | 3/2005 | Crean ...................... | 296/156 |

* cited by examiner

Primary Examiner—Faye M. Fleming

(57) ABSTRACT

A chassis for a recreational vehicle having an open lattice structure includes a pair of central longitudinal support units, each including a pair of vertically spaced bearing members that are interconnected to provide vertical rigidity. A pair of side longitudinal support units extend parallel to the central longitudinal support units and also include a pair of vertically spaced bearing members interconnected to provide vertical rigidity. The central longitudinal support unit includes a further lower bottom member positioned at the same vertical distance as the lower side longitudinal support bearing member. Interconnecting members provide both vertical and horizontal rigidity so that a stable chassis platform is provided without requiring additional structural support and strength from any hull built thereon.

32 Claims, 4 Drawing Sheets

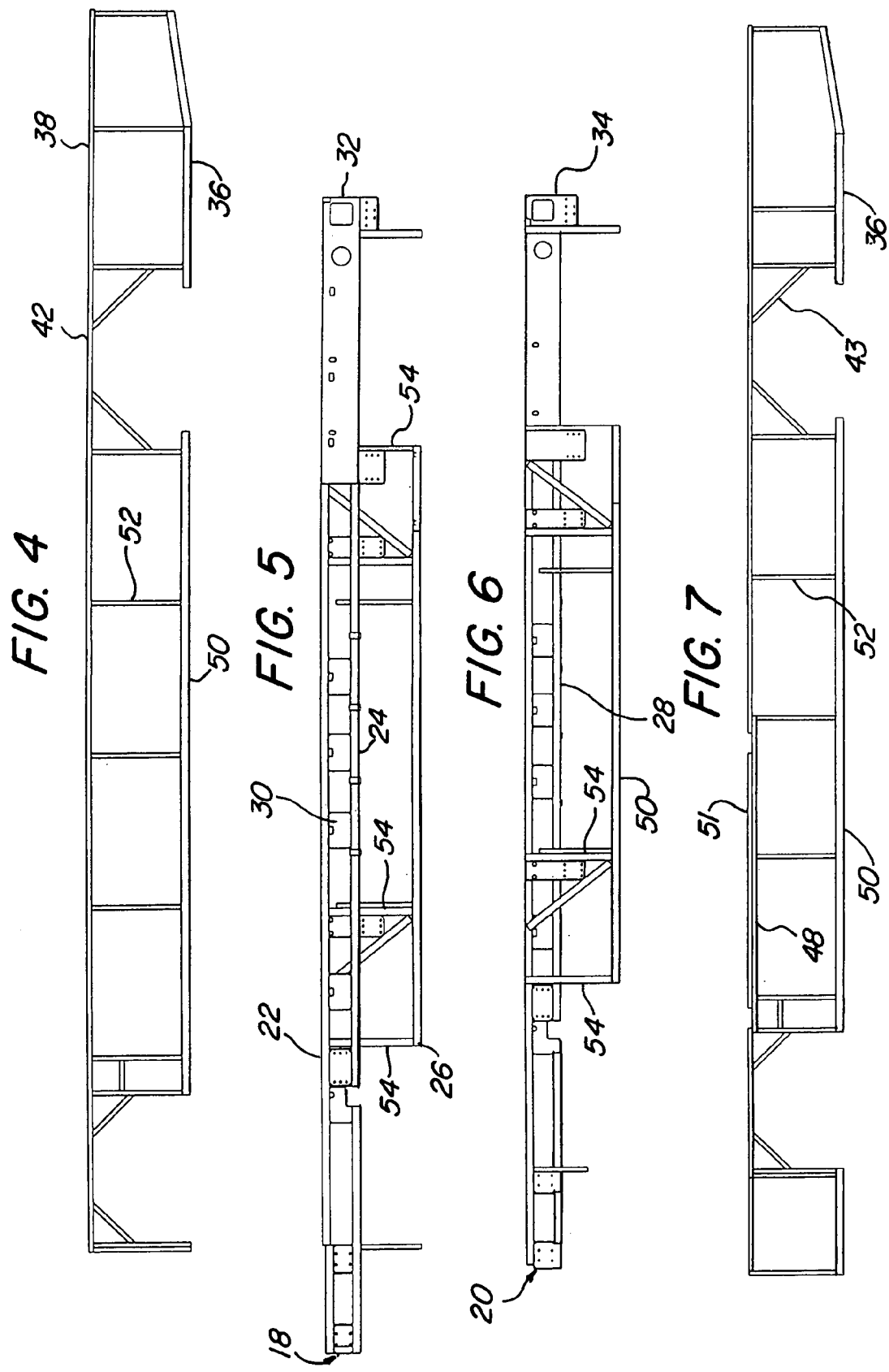

RECREATIONAL VEHICLE CHASSIS

BACKGROUND OF THE INVENTION

1. Field of the Invention

The present invention is directed to a light-weight stable recreational vehicle chassis that can provide a stable platform for supporting the hull or superstructure of a recreational vehicle independent of the particular form or structure of the hull and, more particularly, to a recreational vehicle having a hull with side wall extensions that is not further required to provide structural strength to the chassis.

2. Description of Related Art.

As labor cost and fuel cost increase, there is a need to provide a chassis that can support a housing, hull or superstructure that can readily provide the options of extendable side walls to increase the interior space of recreational vehicles. The term "recreational vehicle" includes pullable trailers such as fifth-wheel trailers and travel homes with self-contained motors.

To increase the fuel efficiency of such recreational vehicles, there is a desire to provide a relatively light-weight chassis design that can still provide stability to the vehicle while maintaining rigidity, as well as increasing the storage space that is accessible from the outside of the recreational vehicle.

Motor homes are constructed in a variety of sizes and shapes and have been conventionally constructed with motor vehicle parts and components. As such, motor homes have been normally built on a chassis of a motor vehicle such as, for example, the Freightliner XC Class A motor home chassis that can be used with motor homes of up to 45 feet in length. Such a chassis can typically include a Cummins or Caterpillar diesel engine and automatic overdrive transmission. A pair of I-beams or other structural members are welded on such a chassis to provide sufficient rigidity so that the hull or superstructure can be constructed on top of such a chassis. The hull or superstructure is integrated with the I-beams or other structural members to contribute strength and rigidity and address the torsional stresses that can be generated by bending and twisting movements when the vehicle is in motion.

Problems have occurred when the bending and twisting motions have been transferred from the chassis to the shell, and it is frequently necessary for the shell or hull of the motor home to be sufficiently sturdy to contribute additional strength to the overall structure. As can be appreciated, by adding additional structural members in the shell to compensate for inadequacies in the chassis, this design approach further adds weight and increases the center of gravity of the vehicle. Compounding these problems is the desire to increase the storage space beneath the vehicle again without adding significant weight. An example of a motor home construction to address these issues can be found in U.S. Pat. No. 5,501,504.

The prior art has further attempted to use monocoque and semi-monocoque structures for both the chassis and the hull to reduce weight while increasing strength. Tubular steel cage infrastructures have also been proposed for the body and chassis of various forms of motor vehicles as a means of increasing strength and rigidity without adding significant weight. See, for example, U.S. Pat. No. 2,144,889, U.S. Pat. No. 4,045,075, and U.S. Pat. No. 6,205,736.

Of general interest is U.S. Pat. No. 3,989,119, U.S. Pat. No. 5,690,378, U.S. Pat. No. 5,921,615, and U.S. Pat. No. 6,343,830.

Recreational vehicles, including motor homes and trailers, have of recent years included extendable rooms or side wall units that permit the recreational vehicle, when stationary, to extend the walls of the recreational vehicle to increase the interior space. Frequently the recreational vehicle will be designed so that it is only functional when the side walls are extended for certain rooms in the recreational vehicle. Thus, a kitchen, bedroom or living room can be significantly extended to increase the living space for the occupants. Since a portion of the side walls must be extended, they cannot be relied upon to provide structural support for the chassis, and as larger areas of the side walls are extended or multiple sections of side walls are extended for one or more rooms, the ability to provide a contribution to the strength of the chassis section has been reduced.

Thus, there is still a need in the prior art to provide a chassis structure that can support various cargo or load configurations and not be dependent upon side wall strength. It is also desirable to provide basically a one-piece construction that will increase the under floor storage capacity while facilitating preproduction coating procedures such as dip processes and minimizing weight. Finally, it is desirable to provide a chassis that can serve as a solid stable platform regardless of the number and location of the side wall extensions that are desired for the hull or superstructure of the recreational vehicle.

SUMMARY OF THE INVENTION

The present invention provides a chassis for a recreational vehicle that can include at least a pair of central longitudinal support units with each central longitudinal support unit including a pair of vertically spaced bearing members that are interconnected to provide vertical rigidity. The upper vertical spaced bearing members form a portion of the top surface of the chassis structure. A lower plurality of cross-support units include at least a pair of spaced horizontally positioned bearing members that are interconnected to provide horizontal rigidity. A plurality of interconnecting members join the upper pair of central longitudinal support units to the plurality of cross-support units to provide a stable platform to enable a vehicle hull to be mounted thereon. The bearing members can be formed from elongated metal tubes, for example, of a cross-sectional square configuration. The metal tubes can be welded together and arranged in a parallel manner so that the pair of vertically spaced metal tubes are parallel to each other in the longitudinal support units. Likewise, the cross-support units can also comprise elongated metal tubes that are parallel spaced within interconnecting members welded thereto. The interconnecting members can further include a plurality of side cross-panels extending vertically upward from ends of the cross-support units.

An open space support beam can be used in a central longitudinal support unit with a pair of upper and lower elongated tubular members vertically spaced in a parallel arrangement adjacent each other, and a plurality of interconnecting support members welded to the upper and lower tubular members such as plate members to lock the upper and lower tubular members into a unitary structure to address torsional stresses.

An improved recreational vehicle incorporating a chassis with at least one central longitudinal support unit including a pair of vertically spaced bearing members that are interconnected to provide vertical rigidity, at least a pair of side longitudinal support units with a pair of vertically spaced bearing members that are interconnected, a plurality of cross-support units to provide horizontal rigidity and a plurality of interconnected members to join the longitudinal and central support units together are provided. A wheel unit is mounted on the chassis and a hull unit is attached to the chassis having side walls and a roof. At least a portion of the side walls is extendable to increase interior space within the hull unit and can be selected without requiring additional strength considerations in the chassis design, thereby providing a universal chassis configuration.

A pair of axle panel units are connected to respectively the vertically spaced bearing members and extend vertically therefrom to provide support for enabling a mounting of an axle and wheel unit. The chassis can further include at least three pair of cross-support units with a central cross-support unit including three parallel metal tubes, and the upper longitudinal support units can include two additional side longitudinal support units, one on either side of the central longitudinal support unit, to provide additional strength. The arrangement of the pairs of central and side longitudinal support units and the plurality of cross-support units with the inner connecting members can form a plurality of three-dimensional open box configurations stacked in the longitudinal direction and in a traverse horizontal direction to form a chassis that can be mounted between a front steering axle system and a rear axle drive system. This improved chassis structure does not require the traditional I-beam support chassis, and both single and double axle wheel units can be directly mounted to this chassis and a motor module can be mounted on appropriate motor mounts at the rear end of the chassis structure.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 4 is a left side view of a lateral longitudinal support unit of the present invention;

FIG. 5 is a left side view of a central longitudinal support unit of the present invention;

FIG. 6 is a right side view of the central longitudinal support unit of the present invention; and FIG. 7 is a right side view of a lateral longitudinal support unit of the present invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the chassis structure of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention.

The improved recreational vehicle and the chassis incorporated in the recreational vehicle can be varied to accommodate different size recreational vehicles and the resulting torsion stresses that would be expected to be experienced in an appropriately sized hull mounted on such chassis. Accordingly, the embodiments disclosed herein represent a preferred embodiment which can be appropriately scaled for different dimensional recreational vehicles, particularly in their longitudinal lengths. Also, the embodiments disclosed herein can accommodate single pair axles and tag axles.

Figure 1:
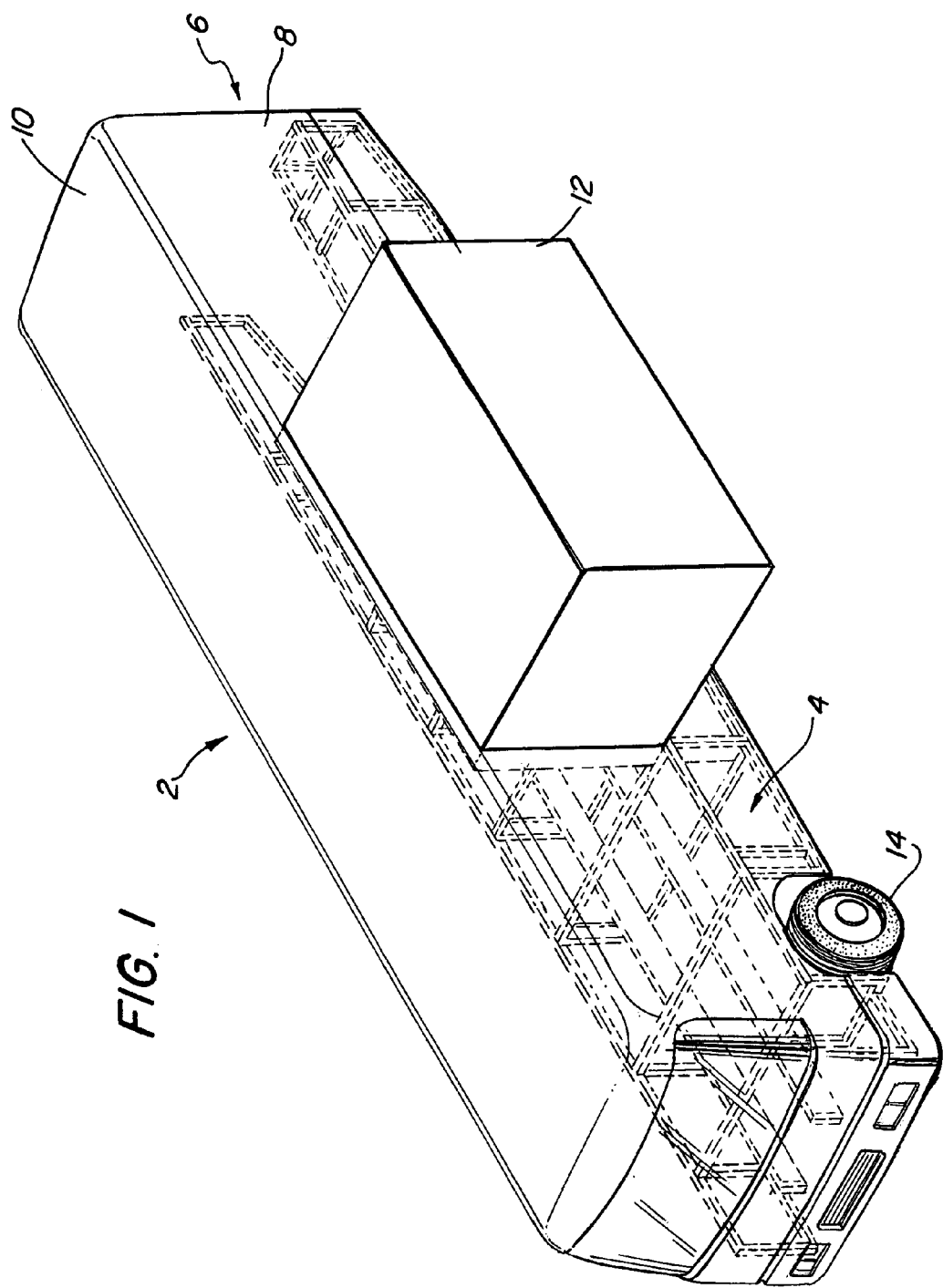
FIG. 1 is a schematic perspective view of a recreational vehicle with an extended slide room mounted on a chassis of the present invention.

Referring to FIG. 1, a recreational vehicle 2 in the form of a motor home is disclosed in a schematic perspective view. The chassis 4 is disclosed in dotted lines and the hull 6 can be built upon this stable chassis. The designers of the particular hull 6 will be free from the concern of adding extra weight and structure to the hull to provide an additional strengthening to the supporting chassis 4. Thus, the designer can, for example, provide relatively lightweight side walls 8 and roof 10 and will have the freedom to place one or more movable or slideable rooms that can be extended to increase the living space within the recreational vehicle 2 when it is stationary, for example, at a camp site. The specifics of slideable rooms in recreational vehicles are known in this industry by persons of ordinary skill and need not be repeated herein.

In FIG. 1, only one large extendable or slideable room 12 is disclosed; however, it can be readily appreciated that more than one slideable room can be provided on one or more sides 8 of the recreational vehicle 2. Since the hull structure 6 does not require additional strengthening beams to add strength and stability to the chassis, it can be constructed with relatively lightweight structural elements to thereby lower the center of gravity of the overall recreational vehicle 2. The chassis 4 which comprises an interconnected supported lattice of, for example, steel tubular structural beam units, welded or fastened together, is also relatively lightweight and can facilitate production processing steps such as applying protective coatings to the chassis 4 to protect it from the environment. The hull 6 can be appropriately anchored onto such a stable chassis platform so that not only a torsion-resistant recreational vehicle is provided, but a relatively lightweight and fuel efficient recreational vehicle can be employed.

Figure 2:
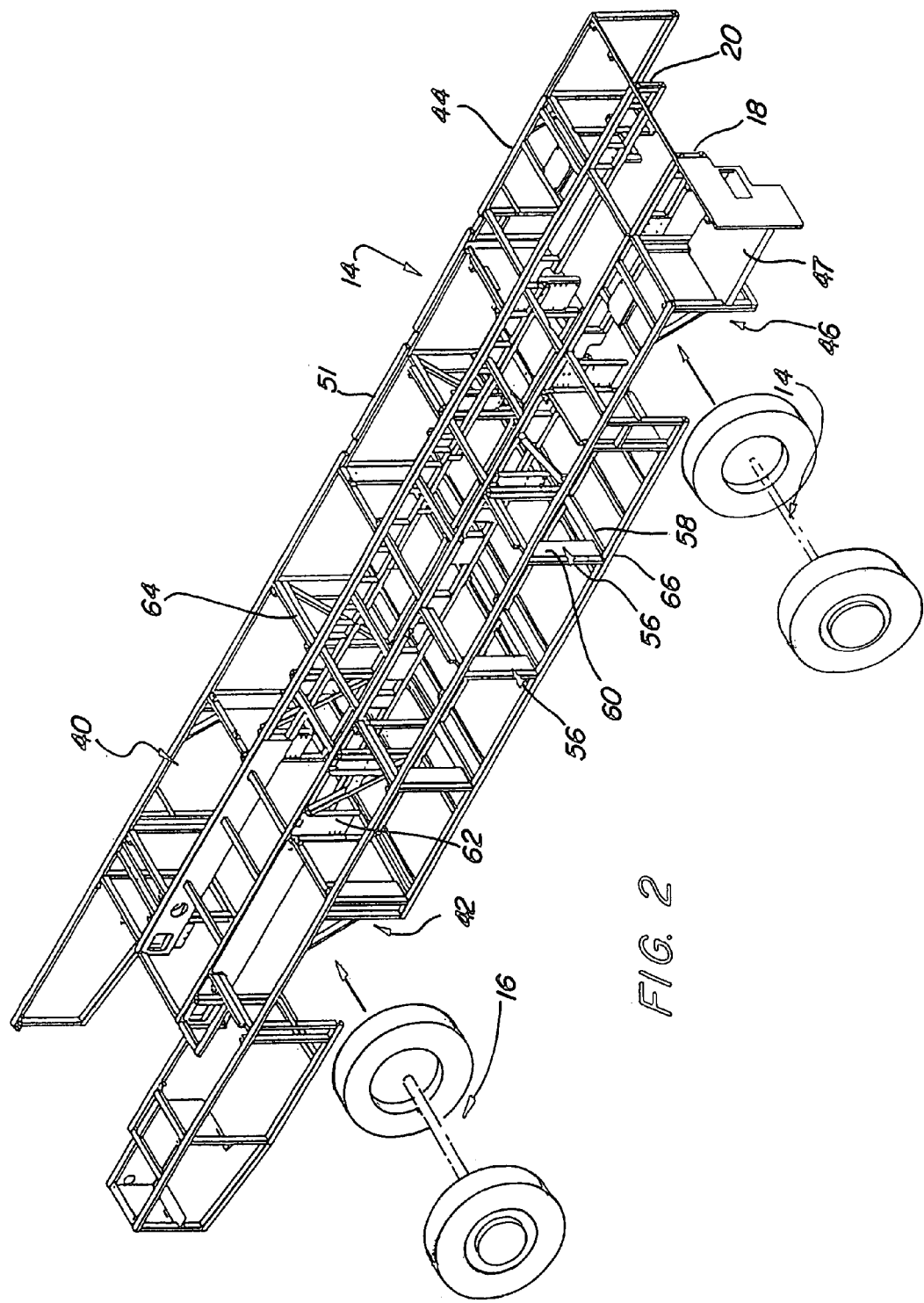
FIG. 2 is a perspective front view of a chassis of the present invention.

Referring to FIG. 2, one embodiment of a chassis 4 formed of an interconnected support lattice of tubular support beam units, such as cross-sectionally square metal tubes, is disclosed with a front wheel assembly 14 and a single axle rear wheel assembly 16 schematically shown relative to the appropriate wheel wells built within the chassis 4. By lengthening the chassis, a tag axle can be added.

Figure 3:
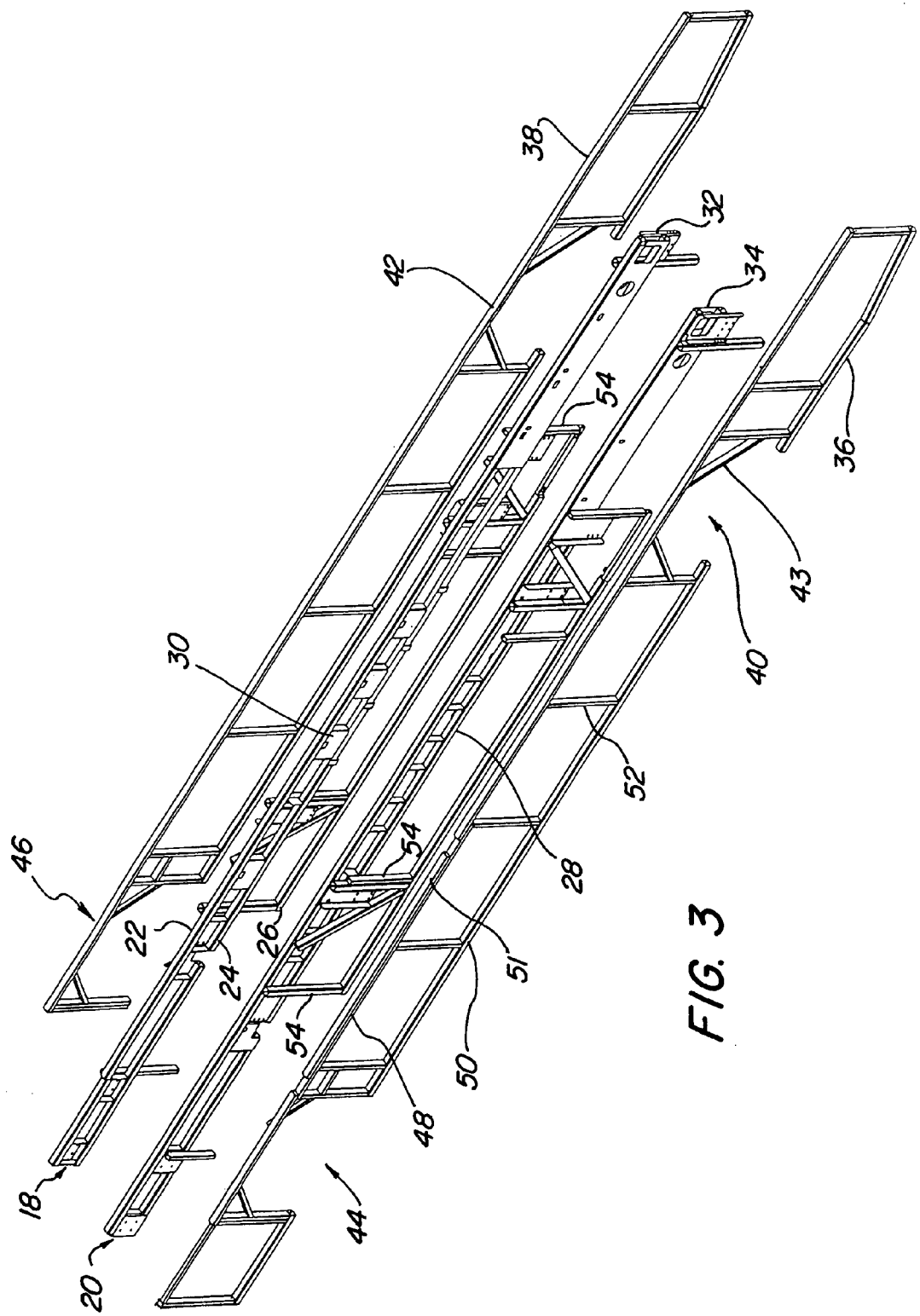
FIG. 3 is a perspective partial rear view of a chassis of the present invention.

FIG. 3 discloses the chassis 4 with horizontal support members removed for ease of illustration and further viewed from a perspective rear view as opposed to the perspective front view of FIG. 2. A pair of central longitudinal support units or torsion units 18 and 20 extend down a central portion of the chassis 6 and each includes a pair of vertically spaced and relatively adjacent elongated tubular members or bearing members 22 and 24 and a bottom tubular member 26. As can be appreciated, the basic structure of each of the central longitudinal support units 18 and 20 represents mirror images of each other and, accordingly, a description of the same elements constituting each of the central longitudinal support units will not be repeated, although it should be understood that the same elements are provided for each of the respective structures.

The upper elongated tubular member 22 is positioned above a lower elongated tubular member 24 by about 10 inches and a plurality of support members 28 interconnect the upper bearing member 22 to the lower bearing member 24. The support members can be bent U-shaped flat steel plates 20 that are welded to the respective upper elongated tubular member 22 and a lower elongated tubular member 24. The U-shaped plates 20 are spaced along the central longitudinal support unit and provide rigidity to the respective central longitudinal support units 18 and 20.

Along a central or core section midway between each of the respective central longitudinal support units 18 and 20 extends a parallel bottom elongated tubular member 26 that is about 30 inches below the upper tubular 22. Vertical interconnecting members 54 connect the bottom elongated tubular member 26 to the respective upper elongated tubular member 22 and lower elongated tubular member 24.

The combination of the upper tubular member 22 and the lower tubular member 24 along with the support members such as the plates 30 that interconnect the respective tubular members 22 and 24 form an open space support beam unit of about 10 inches in vertical height that can provide a lightweight torsion unit for interconnecting axle and wheel units and supporting a vertical load.

As shown in FIG. 3 at the rear of the central longitudinal support units 18 and 20 are support beams respectively 32 and 34 which extend over the rear wheel wells 40 and 42. These support beams 32 and 34 also facilitate interconnection with motor mounts for a rear drive recreational vehicle 2.

Running parallel to the central longitudinal support units 18 and 20 are side longitudinal support units or lateral elongated torsion members 36 and 38 that will support the outer skirts or lower wall panels of the recreational vehicle.

With the exception of an entrance platform 47 for steps into the recreational vehicle, the respective side longitudinal support units 36 and 38 are approximately identical. Each of these side longitudinal support units 36 and 38 include an upper lateral elongated tubular member 48 and a lower lateral elongated tubular member 50. The side upper lateral elongated tubular member 48 is parallel and on the same level as the central upper elongated tubular members 22 and 24 of the respective central torsion units 18 and 20. These elongated tubular members can have a configuration of a square tube and can be further supplemented with elongated support plates for increased strength along the top edge. The horizontal distances are approximately 31 inches between the central support units and also to each side support unit. These four parallel elongated tubular members form a support surface upon which the hull will be anchored and the floor of the recreational vehicle will be immediately supported. Lateral side support members 52 can be welded to extend vertically upward from the lower lateral elongated tubular members to provide rigidity in a vertical plane.

The upper lateral elongated tubular member 48, lower lateral elongated tubular member 50, and spaced lateral side support members 52 further define a frame for lower side panels or walls of the bull and can support a series of doors not shown that can be opened to provide storage. Note in drawings of FIGS. 2 and 3, a series of overlaid aluminum tubes 51 on one side of the hull are used to install the various doors (not shown). Thus, luggage doors, accessory plumbing and electric doors can be hung along these lateral elongated torsion members 36 and 38. As can be seen, the lateral elongated torsion members 36 and 38 can also have diagonal support members 43 located in respective wheel wells 40, 42, 44 and 46 to provide additional support.

As seen in FIG. 2, side cross-panels or flat plates 56 can be welded adjacent horizontal spaced bearing members 58 to provide further support. Additionally, central cross-panels 62 of a U-shaped configuration can also be welded to the central longitudinal support units 18 and 20 to extend traverse to upper interconnecting members 64 and to connect to a lower horizontal spaced bearing member 58 to further provide rigidity and strength in not only the vertical but the horizontal direction of the chassis.

A central cross-support unit 66 having three horizontal lower spaced bearing members 58 is provided at approximately the midpoint of the chassis section. Other traversely crossing horizontal spaced bearing members 58 also provide rigidity and a support for a bottom floor of a plurality of storage spaces that can be provided beneath the living quarters of the recreational vehicle.

Since conventional chassis C channel rails combined with solid I-beams have been replaced by an open lattice structure of the central longitudinal support units 18 and 20, additional storage space can also be provided that would not generally be available or accessible in most prior art recreational vehicles, for example, skis and fishing poles could be stored to extend traverse to the longitudinal axis of the recreational vehicle. Such design features also accommodate the designer of the recreational vehicle for positioning and locating storage tanks for both fresh and waste water.

As can be readily appreciated, a plurality of central cross-support units 66 along with a plurality of interconnecting members such as the upper interconnecting member 64 and the lower horizontal spaced bearing members 58, when welded to both the central longitudinal support units 18 and 20 and the side longitudinal support units 36 and 38, form a plurality of three-dimensional open box configurations stacked not only in the longitudinal direction, but also in a traverse horizontal direction to form an open lattice chassis, formed of metal tubes such as square hollow metal tubes, that can be mounted between a front steering axle system and a rear axle drive system. These open box configurations can be further utilized to increase the storage capacity for the recreational vehicle.

Thus, the present invention not only provides a stable chassis platform in which to anchor the upper hull of the recreational vehicle, but further increases storage space and provides design options while maintaining a relatively strong but lightweight chassis. Accordingly, fuel economy can be improved and the ability to move and manipulate the chassis during construction, for example, for dip coating against rust and the environment, is further facilitated to increase the efficiency of the production line. Also the wheelbase for particular floor plans of a recreational vehicle can be modified to easily lengthen or shorten the distance.

FIGS. 4 through 7 disclose respective side views of the central longitudinal support units 18 and 20 and the lateral or side longitudinal support units 36 and 38.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A chassis for a recreational vehicle comprising:
   at least a pair of central longitudinal support units, each central longitudinal support unit includes a pair of vertically spaced bearing members that are interconnected to provide vertical rigidity;
   at least a pair of side longitudinal support units, each side longitudinal support unit includes a pair of vertically spaced bearing members that are interconnected to provide rigidity and are spaced a predetermined distance to provide an access to storage space within the chassis;
   a plurality of cross-support units, each cross-support unit includes at least a pair of horizontally spaced bearing members that are interconnected to provide horizontal rigidity; and
   a plurality of interconnecting members to join the respective pair of central and side longitudinal support units to the plurality of cross-support units to provide a stable platform to enable a vehicle hull to be mounted thereon.

2. The chassis of claim 1 wherein the respective pair of central and side longitudinal support units, the plurality of cross-support units and the plurality of interconnecting member, form a plurality of three dimensional open box configurations stacked in the longitudinal direction and in a traverse horizontal direction to form a chassis that can be mounted between a front steer axle system and a rear axle drive system.

3. The chassis of claim 1 wherein the vertically spaced bearing members are metal tubes.

4. The chassis of claim 3 wherein the horizontally spaced bearing members are metal tubes.

5. The chassis of claim 1 wherein the plurality of interconnecting members include a plurality of side cross-panels extending vertically upward from ends of the cross-support units.

6. The chassis of claim 5 wherein the central longitudinal support units cross over the plurality of cross-support units and a plurality of longitudinal panels extend between the vertically spaced bearing members.

7. The chassis of claim 6 wherein the vertically spaced bearing members are cross-sectionally square metal tubes.

8. The chassis of claim 1 further including a pair of axle panel units connected to one of the vertically spaced bearing member and extending vertically therefrom to provide support for enabling a mounting of an axle and wheel unit.

9. The chassis of claim 1 wherein the pair of vertically spaced bearing members are metal tubes extending parallel to each other with an upper metal tube positioned along a top of the chassis and the pair of horizontal spaced bearing members are metal tubes extending parallel to each other and both spaced horizontal spaced bearing members are positioned along a bottom of the chassis.

10. A chassis for a recreational vehicle comprising:
    at least a pair of longitudinal support units, each longitudinal support unit includes a pair of vertically spaced bearing members that are interconnected to provide vertical rigidity;
    a plurality of cross-support units extending beneath and across the pair of longitudinal support units, each cross-support unit includes at least a pair of horizontally spaced bearing members that are interconnected to provide horizontal rigidity; and
    a plurality of interconnecting members to join the pair of longitudinal support units to the plurality of cross-support units to provide a stable platform to enable a vehicle hull to be mounted thereon.

11. The chassis of claim 10 wherein the pair of longitudinal support units, the plurality of cross-support units and the plurality of interconnecting members form a plurality of three-dimensional open box configurations stacked in the longitudinal, direction and in a traverse horizontal direction to form a chassis that can be mounted between a front steer axle system and a rear axle drive system.

12. The chassis of claim 10 wherein the vertically spaced bearing members are metal tubes.

13. The chasms of claim 12 wherein the horizontally spaced bearing members are metal tubes.

14. The chassis of claim 10 wherein the plurality of interconnecting members include a plurality of side cross-panels extending vertically upward from ends of the cross-support units.

15. The chassis of claim 14 wherein the longitudinal support units cross over the plurality of cross-support units and a plurality of longitudinal panels extend between to vertically spaced bearing members.

16. The chassis of claim 15 wherein the vertically spaced bearing members are cross-sectionally square metal tubes.

17. The chassis of claim 10 further including a pair of axle panel units connected to one of the vertically spaced bearing members and extending vertically therefrom to provide support for enabling a mounting of an axle and wheel unit.

18. The chassis of claim 10 wherein the pair of vertically spaced bearing members are metal tubes extending parallel to each other with an upper metal tube positioned along a top of the chassis and the pair of horizontal spaced bearing members are metal tubes extending parallel to each other and both spaced horizontal spaced bearing members are positioned along a bottom of the chassis.

19. The chassis of claim 18 wherein at least three pair of cross-support units are provided and a central cross-support unit includes three parallel metal tubes.

20. The chassis of claim 19 further including two additional longitudinal support units, one on unbar side of the chassis, each respective spaced bearing member in every longitudinal support unit is a metal tube of a square configuration aligned in parallel with each of the other metal tubes.

21. A recreational vehicle comprising:
    a interconnected supported lattice chassis consisting of;
    at least a pair of central longitudinal support units, each central longitudinal support unit includes a pair of vertically spaced bearing members that are interconnected to provide vertical rigidity;
    at least a pair of side longitudinal support units, each side longitudinal support unit includes a pair of vertically spaced bearing members that are interconnected to provide vertical rigidity;
    a plurality of cross-support units, each cross-support unit including at least a pair of horizontally spaced bearing members tat are interconnected to provide horizontal rigidity; and
    a plurality at interconnecting members to join the respective pair of longitudinal and central support units to the plurality of cross-support units to provide a stable platform; and
    a wheel unit mounted on the chassis for translating the chassis across a support surface; and a hull unit attached to the chassis having at least side walls and a roof, at least a portion of one of the side walls is extendable to increase interior space within the hull unit.

22. In a recreational vehicle having a wheel unit mounted on a chassis and a hull unit attached to the chassis having at least side walls and a roof, the hull unit is anchored to the chassis and is not required to further strengthen the chassis, the improvement comprising an interconnected support lattice of tubular support beam units for a recreational vehicle chassis comprising:
   a pair of central elongated torsion units, each including,
      an upper elongated tubular member, a lower elongated tubular member extending parallel to and beneath the upper elongated tubular member, and
      a plurality of support members interconnecting the upper and lower elongated tubular members at predetermined spaced positions to lock the upper and lower tubular members together to create a torsion unit, and
   a pair of bottom elongated tubular members, each extending parallel to one of the upper and lower tubular members and at a spaced distance beneath the lower tubular member, the bottom tubular member is fixed to both the upper and lower tubular members to further strengthen the central torsion unit; and
   a pair of side parallel elongated torsion units, one each positioned laterally outward and parallel to one of the central elongated torsion units, each aide elongated torsion unit including an upper elongated tubular member at a vertical position of the same height as the upper elongated tubular member of the central elongated torsion units, a lower elongated tubular member of the same height as the pair of bottom elongated tubular members and a plurality of lateral side support members interconnecting the upper and lower tubular members.

23. The recreational vehicle of claim 22 further including a plurality of horizontal spaced bearing members for interconnecting respectively the pair of central elongated torsion units and the pair of parallel side elongated torsion units.

24. An open space support beam unit for a recreational vehicle chassis comprising:
   an upper elongated tubular member;
   a lower elongated tubular member extending parallel to and beneath the upper elongated tubular member; and
   a plurality of support members including plate members interconnecting the upper and lower elongated tubular members at predetermined spaced positions to lock the upper and lower tubular members together to create a torsion unit for interconnecting axle and wheel units and supporting a vertical load.

25. The support beam unit of claim 24 wherein the plurality of support members include plate members welded to the upper and lower tubular members.

26. The support beam unit of claim 25 further including a bottom elongated tubular member extending parallel to the upper and lower tubular members and at a spaced distance beneath the lower tubular member, a first end of the bottom tubular member is fixed to both the upper and lower tubular members and a second end of the bottom tubular member is fixed to both the upper and lower tubular members to further strengthen the torsion unit.

27. The support beam unit of claim 26 wherein the bottom tubular member is spaced sufficient below the lower tubular member to support a storage surface.

28. The support beam unit of claim 26 wherein the first and second ends are fixed by vertical tubular support members and U-shaped support plate members.

29. The support beam unit of claim 26 wherein the plate members are U-shaped.

30. An interconnected support lattice of tubular support beam units for a recreational vehicle chassis comprising:
   a pair of central elongated torsion units, each including,
   an upper elongated tubular member,
   a lower elongated tubular member extending parallel to and beneath the upper elongated tubular member, and
   a plurality of support members interconnecting the upper and lower elongated tubular members at predetermined spaced positions to lock the upper and lower tubular members together to create a torsion unit, and
   a pair of bottom elongated tubular members, each extending parallel to one of the upper and lower tubular members and at a spaced distance beneath the lower tubular member, a first end of the bottom tubular member is fixed to both the upper and lower tubular members and a second end of the bottom tubular member is fixed to both the upper and lower tubular members to further strengthen the central torsion unit.

31. The interconnected support lattice of claim 30 further including a pair of parallel lateral elongated torsion units, one each positioned laterally outward and parallel to one of the central elongated torsion units, each lateral elongated torsion unit including an upper lateral elongated tubular member at a vertical position of the same height as the upper elongated tubular member of the central elongated torsion units, a lower lateral elongated tubular member of the same height as the pair of bottom elongated tubular members and a plurality of lateral side members interconnecting the upper and lower tubular members.

32. The interconnected support lattice of claim 30 further including a plurality of horizontal spaced bearing members for interconnecting respectively the pair of central elongated torsion units and he pair of parallel lateral elongated torsion units.

* * * * *